United States Patent

Hamaguchi et al.

[11] Patent Number: 5,835,305
[45] Date of Patent: Nov. 10, 1998

[54] MAGNETIC DISK APPARATUS EMPLOYING LIQUID BEARING TYPE OR PHYSICAL CONTACT TYPE MAGNETIC HEAD SLIDER

[75] Inventors: Tetsuya Hamaguchi, Ibaraki-ken; Yoshihiro Shiroishi, Hachioji; Yukio Kato, Ibaraki-ken; Masaaki Matsumoto, Odawara; Hiromitsu Tokisue, Ibaraki-ken; Takayuki Nakakawaji, Kitaibaraki; Shuji Imazeki, Hitachi, all of Japan

[73] Assignee: Hitachi, Ltd., Tokyo, Japan

[21] Appl. No.: 353,983

[22] Filed: Dec. 6, 1994

[30] Foreign Application Priority Data

Dec. 7, 1993 [JP] Japan .................................. 5-306248

[51] Int. Cl.⁶ ........................................................ G11B 5/58
[52] U.S. Cl. ............................ 360/103; 360/135; 428/695
[58] Field of Search ................................ 360/97.01–97.03, 360/98.01, 103, 104, 119, 122, 125, 126, 135

[56] References Cited

U.S. PATENT DOCUMENTS

| | | | |
|---|---|---|---|
| 4,285,019 | 8/1981 | Scott et al. | 360/103 |
| 4,901,185 | 2/1990 | Kubo et al. | 360/103 |
| 5,047,884 | 9/1991 | Negishi et al. | 360/122 |
| 5,107,384 | 4/1992 | Mitsuhashi | 360/104 |
| 5,126,901 | 6/1992 | Momoi et al. | 360/103 |
| 5,162,163 | 11/1992 | Ohta et al. | 428/695 |
| 5,175,658 | 12/1992 | Chang et al. | 360/103 |
| 5,193,046 | 3/1993 | Lemke et al. | 360/97.02 |
| 5,227,516 | 7/1993 | Tohzuka et al. | 560/182 |
| 5,301,077 | 4/1994 | Yamaguchi et al. | 360/103 |
| 5,327,310 | 7/1994 | Bischoff et al. | 360/103 |
| 5,336,550 | 8/1994 | Ganapathi et al. | 360/103 |
| 5,399,758 | 3/1995 | Miura et al. | 564/150 |
| 5,402,074 | 3/1995 | Keel et al. | 360/103 |
| 5,442,850 | 8/1995 | Kerth | 29/603 |
| 5,444,589 | 8/1995 | Hu et al. | 360/113 |
| 5,488,521 | 1/1996 | Lemke et al. | 360/97.02 |
| 5,488,527 | 1/1996 | Komori et al. | 360/122 |
| 5,492,764 | 2/1996 | Okita et al. | 428/457 |
| 5,541,789 | 7/1996 | Fukuoka et al. | 360/103 |

FOREIGN PATENT DOCUMENTS

| | | |
|---|---|---|
| 3-218545 | 9/1991 | Japan . |
| 5-54578 | 3/1993 | Japan . |

Primary Examiner—Jefferson Evans
Attorney, Agent, or Firm—Antonelli, Terry, Stout & Kraus, LLP

[57] ABSTRACT

A magnetic storage apparatus includes a substantially non-flexible magnetic recording medium, a magnetic head slider having a reading/writing element mounted therein and liquid lubricant provided on the surface of the magnetic recording medium. The liquid lubricant is a liquid in a Newtonian range having a viscosity which is substantially constant irrespective of a shear rate or a liquid having the property that the actual viscosity is increased with increase of the shear rate. The magnetic head slider maintains a gap between the slider and the magnetic recording medium to perform reading and writing while being moved on the liquid lubricant intermittently or continuously in a contact manner with the liquid lubricant. There is provided a device for maintaining a constant flying height even if a movement speed is varied, which flying height is represented by the size of the gap. Thus, the magnetic storage apparatus of the liquid bearing system or the contact system has only very small forces such as liquid drag force and friction force or sticking force and is capable of performing stable slider movement, performing high-speed seeking operation with high reliability and performing high-density recording.

37 Claims, 7 Drawing Sheets

ROTATIONAL DIRECTION OF DISK

ROTATIONAL DIRECTION OF DISK

MAGNETIC DISK APPARATUS EMPLOYING LIQUID BEARING TYPE OR PHYSICAL CONTACT TYPE MAGNETIC HEAD SLIDER

BACKGROUND OF THE INVENTION

The present invention relates to a magnetic disk apparatus, information storage apparatuses of various types and an information reading apparatus, and more particularly to a liquid bearing type or a physical contact type magnetic head slider suitable for high density recording and highly reliable operation, a movement system thereof and a magnetic storage apparatus using the slider and the movement system.

The state of the prior art is now described by taking a magnetic disk apparatus as an example.

Recently, in order to achieve a low flying height, a liquid bearing system has been studied as a substitution technique for an air bearing (cushion) system. Since liquid can form a hard liquid lubricating layer as compared with air, a very low flying height can be attained. With regard to a member making physical contact with liquid, heretofore, there are such as a flexible disk, a so-called floppy disk and a magnetic tape having a surface in which a lubricating agent is impregnated or applied. However these devices do not have the concept of liquid bearing being substituted for an air bearing and utilize sliding on a surface at a low speed to the extent that the surface is not destroyed due to the sliding while contacting with the surface. A non-flexible disk apparatus to be discussed herein has a high rotational speed, a design concept and technical measures which are different from these devices. Further, in a prior art liquid magnetic drum arrangement, for example, a flying height is large and hence a thickness of a liquid layer is considerably thick. In addition, the liquid magnetic drum arrangement does not take into account a variation in the flying height versus a moving speed and the properties to be discussed herein are different from those of the liquid magnetic drum arrangement.

In the prior art pertinent to the present invention, a slider having four rails in total including plane rails and taper flat rails having relatively large areas is liquid borne on a non-Newtonian liquid lubricant as described in, for example, U.S. Pat. No. 5,193,046 and a spherical slider is liquid borne as described in JP-A-5-54578.

The liquid bearing system has a problem of the liquid drag force acting on the slider. The prior art described in the U.S. Pat. No. 5,193,046 utilizes liquid having the property that the viscosity of the liquid is reduced when the shear rate of the liquid is increased, a so-called non-Newtonian liquid to thereby reduce the liquid drag force. However, when the non-Newtonian liquid having the reduced viscosity is utilized, the viscosity thereof is reduced at the outer peripheral side of a disk in which the shear rate is increased. Consequently, there is a merit that the dependence on the disk rotational speed of the flying height is reduced, while the stiffness of the liquid layer is reduced due to reduction of the viscosity. The magnetic disk apparatus requires that the slider follows vertical movement of the disk surface, caused by fluctuation of the disk and external disturbance, with a constant flying height and is hereinafter referred to as the "following characteristic". The following characteristic is largely dependent on the stiffness of the liquid layer supporting the slider and the stiffness is proportional to the viscosity of liquid. Particularly, the following characteristic in the case where the disk rotational speed of the outer periphery of the disk is high is very important in order to ensure the reliability. Further, there is a problem that liquid is scattered by the centrifugal force of rotation when the viscosity of liquid is reduced upon high-speed rotation. Accordingly, in the prior art, a device for supplying liquid is provided, while there is a problem that the device is very difficult technically and very expensive.

As described above, in the non-Newtonian liquid, problems arise including the problem that the stiffness of the liquid layer is small or reduced since the viscosity is small or reduced and the problem that the liquid has a tendency to be scattered by the centrifugal force and the supply means of liquid is necessary.

Further, the prior art liquid bearing slider described in U.S. Pat. No. 5,193,046 has a large rail area in which an area of one rail is about 0.8 mm$^2$ and the total area is about 3.2 mm$^2$. Since the liquid drag force is proportional to the rail area in addition to the viscosity of liquid, the liquid drag force is considerably large and is of the order of several grams. The liquid drag force is observed as a tangential force and its magnitude is unstable so that a magnetic head slider is vibrated and a magnetic disk is difficult to rotate. In addition, when the planar rail comes into contact with the liquid layer as in the prior art, sticking and adsorption occur remarkably and the force thereof reaches several tens of grams, so that a magnetic disk cannot be often started to be rotated.

Furthermore, in the prior art slider described in U.S. Pat. No. 5,193,046, the rail surface is cut at the rear end thereof by a rear end surface which is substantially perpendicular to the rail surface. Accordingly, the pressure within a floating gap which in the form of a wedge formed between the rail surface and the disk surface and reduced in the moving direction is positive in every place and the maximum pressure occurs at a substantially rear end of the gap. The pressure of a flow coming out from the rear end returns to the atmospheric pressure at the coming-out end suddenly. That is, the pressure in the floating gap and the subsequent flow is positive in every place and accordingly when the slider stands still at the same track of the disk, there is a problem that lubricant on the slider movement track is excluded from the movement track due to the positive pressure and the thickness of the lubricant on the track is reduced.

In addition, when lubricant having the viscosity which is not varied or is increased by the increased shear rate is used, there is a problem that the flying height is largely varied by change of the disk rotational speed since the pressure in the gap is positive in every place and the lubricant is a non-compressive liquid.

Further, the lift acting on the slider in the case of liquid is large as compared with air. Accordingly, in order to realize a low flying height in the liquid bearing system, a pressing load of about several grams to several tens grams is required as described in U.S. Pat. No. 5,193,046. When the pressing load is large, the sticking problem described above is caused and wear on the magnetic disk and the slider is expedited, so that there is a high possibility that the magnetic disk and the slider are damaged and broken to lead to a so-called head crash.

In the prior art slider described in U.S. Pat. No. 5,193,046, there are four pressure peaks of the fluid lift acting on the slider by rotation of the disk, i.e. there are four contact points with the disk. The lift or the contact force acting on the four points is balanced and the resultant force thereof is further balanced with the pressing load imposed on the slider, so that the slider is moved while flying or touching. In order to balance the lift or the contact force acting on the four points, it is necessary to support the magnetic head slider rotatably with two degrees of freedom. This rotation mechanism is heretofore realized by a mechanism named a gimbal or pivot, while the mechanism has a complicated configuration and requires a high-degree manufacturing technique to thereby impede simplicity and low weight of the support mechanism.

The magnetic head slider requires a so-called seeking operation that the magnetic head slider is moved at a high speed in the radial direction of the magnetic disk. The taper flat rail in the prior art has a taper portion formed in the circumferential direction and accordingly the magnetic head slider is suitable for flying by taking fluid from the taper portion in, while the slider has no taper portion formed in the radial direction or the seeking direction and is not suitable for flying. In the case of the air bearing, since the viscosity of air is low, there is almost no problem for the seeking operation and air flows in, whereas in the case of the liquid bearing the viscosity of the liquid is large and the liquid is difficult to flow in from the seeking direction. In addition, the liquid drag force acts on the slider greatly. The liquid drag force not only impedes the seeking operation itself but also causes solid contact which makes the flying unstable and vibrates and damages the slider, so that the high-speed seeking operation is made impossible.

The above problem occurs not only in the liquid bearing system but also in the system in which the slider is used to be in contact with lubricant exhibiting the non-liquid property by combining with a solid layer chemically or physically. When the slider comes into contact with the lubricant, the friction acts on the slider largely instead of the liquid drag force. The rail surface of the taper flat rail becomes a friction surface and accordingly when an area thereof is large or when a surface shape thereof is not smooth, adsorption force by the friction force or surface force is increased. In the contact system, the increased friction force causes a problem of generating heat and adversely affects the reading and writing operation. The taper flat rail has the taper portion formed in the circumferential direction and accordingly the shape thereof is slightly smooth, while the taper flat rail is angular or square and not smooth in the radial movement or the seeking direction and has large friction force. Accordingly, even in the contact system, the high-speed seeking operation is impossible in the prior art slider. Further, when the rail area is large, the lift by air is increased and a counter large pressing load is required to thereby reduce the reliability in the same manner as described above.

As measures for solving some problems of the above problems, JP-A-3-218545 discloses a spherical slider. The spherical slider can make small the liquid drag force, while the flying height thereof is varied by a difference between disk rotational speeds at inner and outer peripheries. The recording density in the magnetic disk apparatus is inversely proportional to the flying height and there is a problem that the recording density is limited by the highest flying height at the outer peripheral side when information is recorded on condition of a fixed recording density. Furthermore, there is a problem that when the posture of the slider is changed, a portion other than a reading/writing element portion comes nearest to the disk and the flying height of the reading/writing element portion is increased substantially. In addition, there is a problem that after a reading/writing element is formed in an end surface of two divided spherical surfaces, a process of affixing them and grinding the affixed portion into a spherical surface is required to thereby increase a manufacturing cost and make error in assembly.

As described above, there is a problem that the prior arts are not suitable for the magnetic disk apparatus with high reliability, low flying height and high recording density due to insufficient stiffness of the liquid layer, large liquid drag force and friction force or large sticking and adsorption force, impossibility of high-speed seeking operation, necessity of the rotation and support mechanism with two degrees of freedom and large pressing load, and the flying height which is not even in inner and outer peripheries. The subject of the present invention is not limited to the magnetic disk apparatus and is common to the magnetic storage apparatus having a spacing between the magnetic head slider and the magnetic recording medium which is smaller than or equal to 0.1 micron.

SUMMARY OF THE INVENTION

It is an object of the present invention to provide a magnetic head slider, a movement system thereof and an inexpensive magnetic storage apparatus of a liquid bearing system or a physical contact system with high reliability and high recording density using the magnetic head slider and the movement system, the magnetic head slider having very small liquid drag force and friction force or sticking and adsorption, satisfactorily high-speed seeking operation, a low constant flying height or smooth contact with very small pressing force by a rotation mechanism with one degree of freedom or a support mechanism having no rotation mechanism, and a reading/writing element capable of being mounted in an optimum position.

The above object is achieved by using a Newtonian liquid or lubricant combined with a protection layer and preferably by reducing the contact area of the slider and the surface of the magnetic recording medium to 0.1 mm$^2$ or less and further the slider is preferably formed by a curved surface and a flat surface. In addition, the curved surface of the slider has different radii of curvature in the circumferential direction and the perpendicular direction to the circumferential direction and when the respective radii are larger than 0.5 mm and smaller than 20 mm, practically satisfactory effects are obtained. Further, the slider may be a substantially flat surface or cylindrical surface having a very small rail area so that the slider comes in contact with the magnetic recording medium with the contact area. For example, the slider having one rail constituted by such a surface also has the effects of the resent invention. Furthermore, it is further desirable hat the minimum gap distribution in the movement direction of the slider formed between the movement surface of the slider and the magnetic recording medium has an area where the gap is substantially expanded in the rear of the reading/writing element in the movement direction of the slider so that negative pressure is produced in a portion of the gap of the floating slider. The high density recording can be attained by disposing the reading/writing element including a magnetoresistive element in a substantially rear edge of the slider. As material of the slider, ceramics such as $ZrO_2$ system or $Al_2O_3$—TiC system is preferable in respect to the reliability and the cost and it is particularly preferable that at least one protection layer made of material different from that of the slider is provided in at least a surface of the slider opposite to the medium since the reliability can be extremely improved. Further, in the present invention, it not necessary to provide means for newly supplying or resupplying lubricant.

With the above technical measures, the object of the present invention that the inexpensive magnetic storage apparatus with high reliability and high recording density of the liquid bearing system or the physical contact system in which the magnetic head slider comes into contact with liquid lubricant or lubricant combined chemically and/or physically with the magnetic recording medium is provided can be achieved.

The features of the first group of the invention reside in (1) a magnetic storage apparatus including a substantially non-flexible magnetic recording medium, a magnetic head slider having a reading/writing element mounted therein and liquid lubricant provided on the surface of the magnetic recording medium, wherein the liquid lubricant comprises liquid in a Newtonian range in which viscosity thereof is substantially constant irrespective of a shear rate or liquid having the property that actual viscosity is increased with increase of the shear rate and the magnetic head slider maintains a gap between the slider and the magnetic recording medium to perform reading and writing while being moved on the liquid lubricant intermittently or continuously in a contact manner with the liquid lubricant, and comprising means for maintaining a flying height which is a distance of the gap constant even if a movement speed is varied. In the item (1), (2) it is preferable that the magnetic head slider includes one movement rail for moving the magnetic head slider on a surface of magnetic disk. In the item (2), (3) it is preferable that the reading/writing element is disposed in a substantially rear edge in a movement direction of the magnetic head slider. In the item (3), (4) it is preferable that the reading/writing element is formed within an element layer for fixing the reading/writing element and a surface of the element layer opposite to the magnetic recording medium is formed into an element layer movement surface constituted by a curved surface having the curvature, the reading/writing element being disposed in a point of the element layer movement surface which is substantially nearest to the magnetic recording medium, a minimum gap distribution in the movement direction of the slider formed between the element layer movement surface and the magnetic recording medium including an area where the gap is substantially expanded in the rear of the reading/writing element in the movement direction of the slider. In the item (3), (5) it is preferable that the reading/writing element is formed within an element layer for fixing the reading/writing element and a protection layer is formed in a rear surface of the element layer in the movement direction of the slider, a surface of a rear end layer constituted by the element layer and the protection layer and opposite to the magnetic recording medium being formed into a rear end layer movement surface constituted by a curved surface having the curvature, the reading/writing element being disposed in a point of the rear end layer movement surface which is substantially nearest to the magnetic recording medium, a minimum gap distribution in the movement direction of the slider formed between the rear end layer movement surface and the magnetic recording medium including an area where the gap is substantially expanded in the rear of the reading/writing element in the movement direction of the slider. In the item (1), (6) it is preferable that at least a portion of the movement surface of the magnetic head slider is substantially cylindrical. In the item (6), (7) it is referable that the reading/writing element is disposed in substantially rear edge in the movement direction of the magnetic head slider. In the item (7), (8) it is preferable that the reading/writing element is formed within an element layer for fixing the reading/writing element and a surface of the element layer opposite to the magnetic recording medium is formed into an element layer movement surface constituted by a curved surface having the curvature, the reading/writing element being disposed in a point of the element layer movement surface which is substantially nearest to the magnetic recording medium, a minimum gap distribution in the movement direction of the slider formed between the element layer movement surface and the magnetic recording medium including an area where the gap is substantially expanded in the rear of the reading/writing element in the movement direction of the slider. In the item (7), (9) it is preferable that the reading/writing element is formed within an element layer for fixing the reading/writing element and a protection layer is formed in a rear surface of the element layer in the movement direction of the slider, a surface of a rear end layer constituted by the element layer and the protection layer and opposite to the magnetic recording medium being formed into a rear end layer movement surface constituted by a curved surface having the curvature, the reading/writing element being disposed in a point of the rear end layer movement surface which is substantially nearest to the magnetic recording medium, a minimum gap distribution in the movement direction of the slider formed between the rear end layer movement surface and the magnetic recording medium including an area where the gap is substantially expanded in the rear of the reading/writing element in the movement direction of the slider. In the item (1), (10) it is preferable that the reading/writing element includes at least a reading element using the magnetoresistive effect. In the item (1), (11) it is preferable that a distance between the reading/writing element and a solid protection layer of the magnetic recording medium is longer than 10 nm and shorter than 80 nm. In the item (1), (12) it is preferable that the magnetic head slider is made of ceramics such as $ZrO_2$ system or $Al_2O_3$—TiC system. In the item (1), (13) it is preferable that at least one protection layer made of material different from that of the slider is disposed in a surface of the magnetic head slider opposite to at least the medium.

The features of the second group of the invention reside in (14) a magnetic storage apparatus including a substantially non-flexible magnetic recording medium, a magnetic head slider having a reading/writing element mounted therein and lubricant provided on the surface of the magnetic recording medium, wherein the lubricant is chemically or physically combined with the surface of the magnetic recording medium and the magnetic head slider performs reading and writing while being moved on the lubricant intermittently or continuously in a contact manner with the lubricant. In the item (14), (15) it is preferable that the magnetic head slider includes one movement rail for moving the magnetic head slider on a surface of magnetic disk. In the item (15), (16) it is preferable that the reading/writing element is disposed in a substantially rear edge in a movement direction of the magnetic head slider. In the item (16), (17) it is preferable that the reading/writing element is formed within an element layer for fixing the reading/writing element and a surface of the element layer opposite to the magnetic recording medium is formed into an element layer movement surface constituted by a curved surface having the curvature, the reading/writing element being disposed in a point of the element layer movement surface which is substantially nearest to the magnetic recording medium, a minimum gap distribution in the movement direction of the slider formed between the element layer movement surface and the magnetic recording medium including an area where the gap is substantially expanded in the rear of the reading/writing element in the movement direction of the slider. In the item (16), (18) it is preferable that the reading/writing element is formed within an element layer for fixing the reading/writing element and a protection layer is formed in a rear surface of the element layer in the movement direction of the slider, a surface of a rear end layer constituted by the element layer and the protection layer and opposite to the magnetic recording medium being formed into a rear end layer movement surface constituted by a curved surface having the curvature, the reading/writing element being disposed in a point of the rear end layer movement surface which is substantially nearest to the magnetic recording medium, a minimum gap distribution in the movement direction of the slider formed between the rear end layer movement surface and the magnetic recording medium including an area where the gap is substantially expanded in the rear of the reading/writing element in the movement direction of the slider. In the item (14), (19) it is preferable that at least a portion of the movement surface of the magnetic head slider is substantially cylindrical. In the item (19), (20) the reading/writing element is disposed in a substantially rear edge in the movement direction of the magnetic head slider. In the item (20), (21) it is preferable that the reading/writing element is formed within an element layer for fixing the reading/writing element and a surface of the element layer opposite to the magnetic recording medium is formed into an element layer movement surface constituted by a curved surface having the curvature, the reading/writing element being disposed in a point of the element layer movement surface which is substantially nearest to the magnetic recording medium, a minimum gap distribution in the movement direction of the slider formed between the element layer movement surface and the magnetic recording medium including an area where the gap is substantially expanded in the rear of the reading/writing element in the movement direction of the slider. In the item (20), (22) it is preferable that the reading/writing element is formed within an element layer for fixing the reading/ writing element and a protection layer is formed in a rear surface of the element layer in the movement direction of the slider, a surface of a rear end layer constituted by the element layer and the protection layer and opposite to the magnetic recording medium being formed into a rear end layer movement surface constituted by a curved surface having the curvature, the reading/writing element being disposed in a point of the rear end layer movement surface which is substantially nearest to the magnetic recording medium, a minimum gap distribution in the movement direction of the slider formed between the rear end layer movement surface and the magnetic recording medium including an area where the gap is substantially expanded in the rear of the reading/writing element in the movement direction of the slider. In the item (14), (23) it is preferable that the reading/writing element includes at least a reading element using the magnetoresistive effect. In the item (14), (24) it is preferable that a distance between the reading/ writing element and a solid protection layer of the magnetic recording medium is longer than 10 nm and shorter than 80 nm. In the item (14), (25) it is preferable that the magnetic head slider is made of ceramics such as $ZrO_2$ system or $Al_2O_3$—TiC system. In the item (14), (26) it is preferable that at least one protection layer made of material different from that of the slider is disposed in a surface of the magnetic head slider opposite to at least the medium.

The features of the third group of the invention reside in (27) in a magnetic disk apparatus including a substantially non-flexible magnetic recording medium having lubricant provided on a surface thereof and a magnetic head slider having a reading/writing element mounted therein and which is moved on the lubricant intermittently or continuously in a contact manner with the lubricant, a magnetic storage apparatus comprises a contact area between the magnetic head slider and the lubricant being smaller than 0.1 $mm^2$.

The features of the fourth group of the invention reside in (28) a magnetic storage apparatus including a substantially non-flexible magnetic recording medium, a magnetic head slider having a reading/writing element mounted therein and liquid lubricant provided on the surface of the magnetic recording medium, wherein the liquid lubricant comprises liquid in a Newtonian range in which viscosity thereof is substantially constant irrespective of a shear rate or liquid having the property that actual viscosity is increased with increase of the shear rate and the magnetic head slider includes a movement surface having at least a curved surface with the curvature in a main moving direction and a direction perpendicular to the moving direction and a rear end surface in the moving direction constituted by one or more substantially flat surfaces, the magnetic head slider maintaining a gap between the slider and the magnetic recording medium to perform reading and writing while being moved on the liquid lubricant intermittently or continuously in contact manner with the liquid lubricant, and comprising means for maintaining a flying height which is a distance of the gap constant even if movement speed is varied. In the item (28), (29) it is preferable that the curvature of the curved surface in the main moving direction is different from that in the direction perpendicular to the moving direction. In the item (29), (30) it is preferable that the curvature of the curved surface is larger than 0.5 mm and smaller than 20 mm. In the item (28), (31) it is preferable that the reading/writing element is disposed in a substantially rear edge of the magnetic head slider in the moving direction. In the item (31), (32) it is preferable that the reading/ writing element is formed within an element layer for fixing the reading/writing element and a surface of the element layer opposite to the magnetic recording medium is formed into an element layer movement surface constituted by a curved surface having the curvature, the reading/writing element being disposed in a point of the element layer movement surface which is substantially nearest to the magnetic recording medium, a minimum gap distribution in the movement direction of the slider formed between the element layer movement surface and the magnetic recording medium including an area where the gap is substantially expanded in the rear of the reading/writing element in the movement direction of the slider. In the item (31), (33) it is preferable that the reading/writing element is formed within an element layer for fixing the reading/writing element and a protection layer is formed in a rear surface of the element layer in the movement direction of the slider, a surface of a rear end layer constituted by the element layer and the protection layer and opposite to the magnetic recording medium being formed into a rear end layer movement surface constituted by a curved surface having the curvature, the reading/writing element being disposed in a point of the rear end movement surface which is substantially nearest to the magnetic recording medium, a minimum gap distribution in the movement direction of the slider formed between the rear end layer movement surface and the magnetic recording medium including an area where the gap is substantially expanded in the rear of the reading/writing element in the movement direction of the slider.

The features of the fifth group of the invention reside in (34) a magnetic storage apparatus including a substantially non-flexible magnetic recording medium, a magnetic head slider having a reading/writing element mounted therein and lubricant provided on the surface of the magnetic recording medium, wherein the lubricant is chemically or physically combined with the surface of the magnetic recording medium and the magnetic head slider comprises a movement surface having at least a curved surface with the curvature in a main moving direction and a direction perpendicular to the movement direction and a rear end surface in the movement direction constituted by one or more substantially flat surfaces, the magnetic head slider performing reading and writing while being moved on the lubricant intermittently or continuously in a contact manner with the lubricant. In the item (34), (35) it is preferable hat the curvature of the curved surface in the main moving direction is different from that in the direction perpendicular to the moving direction. In the item (34) or (35), (36) it is preferable that the curvature of the curved surface is larger than 0.5 mm and smaller than 20 mm. In the item (34), (37) it is preferable that the reading/writing element is disposed in a substantially rear edge of the magnetic head slider in the moving direction. In the item (37), (38) it is preferable that the reading/writing element is formed within an element layer for fixing the reading/writing element and a surface of the element layer opposite to the magnetic recording medium is formed into an element layer movement surface constituted by a curved surface having the curvature, the reading/writing element being disposed in a point of the element layer movement surface which is substantially nearest to the magnetic recording medium, a minimum gap distribution in the movement direction of the slider formed between the element layer movement surface and the magnetic recording medium including an area where the gap is substantially expanded in the rear of the reading/writing element in the movement direction of the slider. In the item (37), (39) it is preferable that the reading/writing element is formed within an element layer for fixing the reading/writing element and a protection layer is formed in a rear surface of the element layer in the movement direction of the slider, a surface of a rear end layer constituted by the element layer and the protection layer and opposite to the magnetic recording medium being formed into a rear end layer movement surface constituted by a curved surface having the curvature, the reading/writing element being disposed in a point of the rear end layer movement surface which is substantially nearest to the magnetic recording medium, a minimum gap distribution in the movement direction of the slider formed between the rear end layer movement surface and the magnetic recording medium including an area where the gap is substantially expanded in the rear of the reading/writing element in the movement direction of the slider.

Operation of the present invention is now described by taking a magnetic disk apparatus as an example.

First of all, operation of the present invention relative to the liquid bearing system is described with reference to FIGS. 1 and 2.

Figure 1:
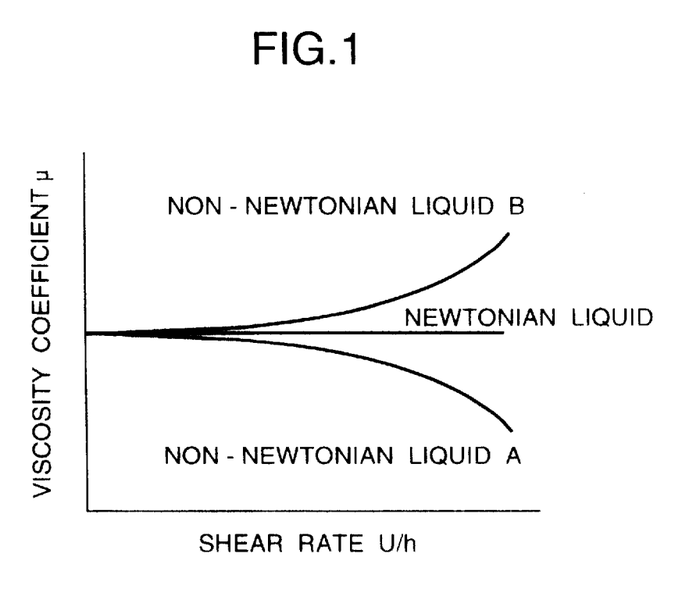
FIG. 1 is a diagram showing properties of liquid.

FIG. 1 is a diagram showing variation of a viscosity coefficient $\mu$ versus a shear rate U/h of liquid. U represents a rotational speed of a disk, that is, a moving speed of the slider and h represents a flying height. Generally, liquid having the viscosity coefficient being substantially constant without the dependence of the shear rate or liquid existing in an area in which the viscosity coefficient is substantially constant without the dependence of the shear rate is named Newtonian liquid and liquid having the viscosity coefficient varying with increase of the shear rate or liquid existing in an area in which the viscosity coefficient varies with increase of the shear rate is named non-Newtonian liquid. There are non-Newtonian liquid of type A having the viscosity reducing with increase of the shear rate and non-Newtonian liquid of type B having the viscosity increasing with increase of the shear rate. The prior art utilizes the property that the viscosity is reduced as indicated by the non-Newtonian liquid of type A. As described above, however, reduction of the viscosity is not preferable since the stiffness of the liquid layer is reduced and liquid is scattered by the centrifugal force. In order to solve these problems, in the present invention, the Newtonian liquid of having the viscosity which is not reduced or the non-Newtonian liquid of type B having the viscosity which is increased with increase of the shear rate is used or the non-Newtonian liquid of type A is used within an area in which the viscosity thereof is not reduced.

Figure 2:
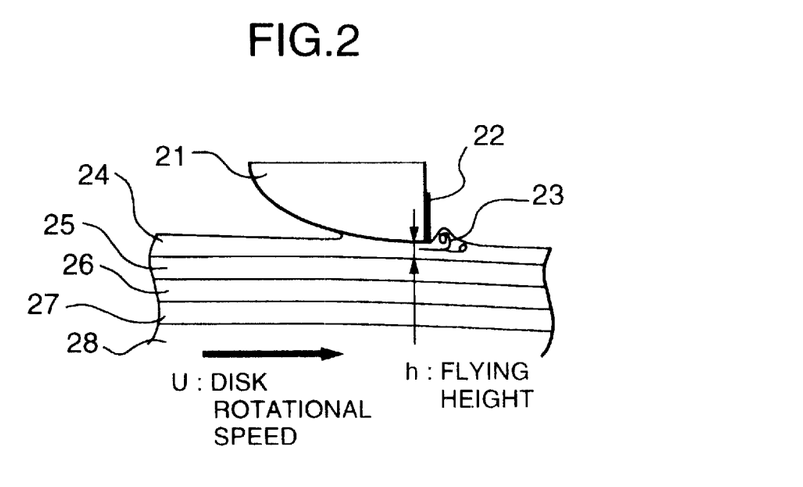
FIG. 2 is a side view schematically illustrating a liquid bearing system of the present invention.

FIG. 2 is a side view illustrating a magnetic head slider being liquid borne or floated on liquid lubricant. The magnetic head slider 21 has a spherical movement surface and a flat rear end surface in the movement direction in which a reading/writing element 22 is mounted. A magnetic disk includes a smooth nonmagnetic substrate 28 on which a basic layer 27, a magnetic layer 26 and a protection layer 25 are fabricated by a thin film fabrication method such as plating, evaporation, sputtering or the like and liquid lubricant 24 having the property of the Newtonian liquid or the non-Newtonian liquid of type B is applied on the uppermost surface by a dipping method, a spray method, an evaporation method, an LB film forming method or the like to have a thickness of about 5 to 100 nanometers. The liquid lubricant 24 enters into a gap in the form of wedge between the protection layer 25 constituting a solid layer and the slider 21 to thereby increase pressure therein, so that the slider is liquid borne or floated by the so-called dynamic pressure bearing principle. At this time, since air flows into the gap from the periphery of the liquid layer, the air lift for floating or flying the slider and adsorption force by the meniscus at the periphery of the contact portion act on the slider and it is possible to design so that a necessary flying height is obtained by utilizing the lift and the adsorption force. In the discussion with reference to FIG. 2, only the liquid bearing operation is described.

Since the liquid lubricant uses the Newtonian liquid or the non-Newtonian liquid of type B, the viscosity thereof is not reduced even upon high speed movement and accordingly the stiffness of the liquid layer is not reduced, so that the floating or liquid bearing is stable. When a flying height h is varied due to external disturbance such as vertical motion of the disk and seeking operation, the slider of the present invention has the following effects in addition to the prior art effect that the restoring force acts on the slider so that the original stable flying height is obtained on the basis of the usual dynamic pressure bearing principle.

First, since the movement surface of the slider is formed into the curved surface, a contact area with liquid is made small to reduce the lift if the flying height h is about to be increased whereas the contact area is made large to increase the lift when the flying height h is about to be reduced. That is, when the flying height h is varied, the restoring force acts on the slider much as compared with the prior art and the floating or bearing stability of the slider is very satisfactory by the restoring force.

Second, since the movement surface of the slider is cut or terminated by the planar surface constituted by the rear end surface, the pressure of liquid increased smoothly in the gap in the form of wedge is released suddenly at this end surface portion. Accordingly, the liquid flow is disturbed at this portion to generate the so-called turbulent flow and there is a case where swirl can be formed in the turbulent flow portion 23. This turbulent flow can suppress increase of the pressure formed by the smooth flow of liquid, that is, the turbulent flow can suppress the usual dynamic pressure bearing effect to reduce the lift or can also generate negative pressure in the turbulent flow portion locally depending on a shape of the slider. The more the lift suppressing effect including the negative pressure effect acts on the slider, the more the flow speed of the liquid or the rotational speed of the disk is, and the lift suppressing effect is canceled with the increased lift, so that the flying height can be made substantially constant irrespective of the rotational speed of the disk.

Third, since the movement surface of the slider is formed into a curved surface, the contact area of the slider and the disk surface or the liquid lubricant is extremely small as compared with the prior art. For example, when the slider is assumed to be a spherical surface and the radius of curvature thereof and a thickness of the liquid lubricant are designed to be about 0.5 to 20 mm and about 5 to 100 nm, respectively, the contact area is about $1.5 \times 10^{-5}$ from 0.01 $mm^2$. When an area of the meniscus at the periphery of the contact portion is considered, the contact area is smaller than about 0.1 $mm^2$. Thus, since the liquid drag force can be suppressed to be in the order of several hundreds milligrams or less even for the Newtonian liquid or the non-Newtonian liquid of type B, the slider of the present invention is very preferable in view of the fundamental property of floating or bearing, the high-speed seeking operation, the power consumption and the reliability.

Further, since the contact area of the lubricant and the slider is small, the lift formed by liquid can be made small and accordingly the pressing load imposed on the slider can be also made small to realize the load smaller than one gram. Thus, even if lubricant is not supplied or resupplied, unpreferable phenomena such as wear of the magnetic disk and the slider, the secular change of the lubricant, generation of heat and increased temperature of the contact portion, adsorption and sticking can be suppressed and the reliability of the apparatus is improved extremely.

Fourth, since the movement surface of the slider is formed into a curved surface, liquid can be flowed into the floating gap easily even when the slider is moved in the seeking direction perpendicular to the direction shown. This means that the above effects can be obtained irrespective of the movement direction of the slider. Further, since the peak of the liquid pressure of the slider occurs at substantially one location in the vicinity of the flowing-out end, it is not necessary to rotate and support the slider. Thus, the support mechanism of the slider can be simplified to advantageously lighten the apparatus in weight and the instability of the slider caused by using the rotation and support mechanism with the low stiffness in the prior art can be solved. Since the reading/writing element is disposed in the rear end surface, the location of the element can always come nearest to the disk surface to thereby perform reading and writing with high recording density even when the floating posture of the slider is slightly changed.

Figure 13:
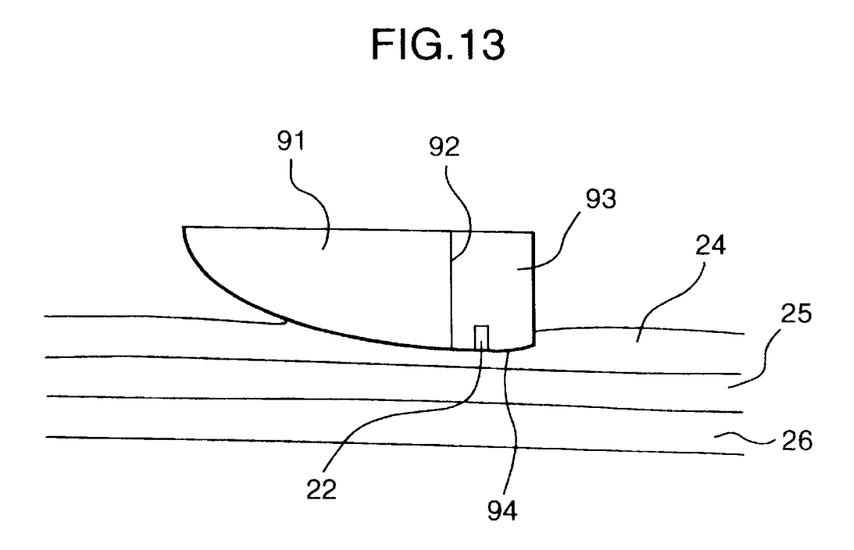
FIG. 13 is a side view illustrating an embodiment of a slider.

In addition, when negative pressure is utilized positively, as shown in FIG. 13, the floating or flying gap formed by the rail surface and the disk surface is once minimized backward in the slider moving direction and is then expanded, so that the negative pressure is produced in the rear in the moving direction of the minimum gap position. The lubricant is excluded out of the movement track by the positive pressure produced ahead of the minimum gap position within the floating gap, while the lubricant is brought back in the track in the moving direction by the negative pressure produced behind the minimum gap position and accordingly a thickness of the lubricant on the movement track is not reduced. Further, when the rotational speed of the disk is, for example, increased, the positive pressure in locations positioned forward of the minimum gap position is increased and an absolute value of the negative pressure in locations positioned backward of the minimum gap position is increased. Even when the rotational speed of the disk is varied by cancellation of varied positive pressure and negative pressure, variation of the floating force is small and accordingly the dependence of the flying height on the rotational speed can be reduced even when the Newtonian liquid or the non-Newtonian liquid having the viscosity increasing upon increase of the shear force is used.

Figure 3:
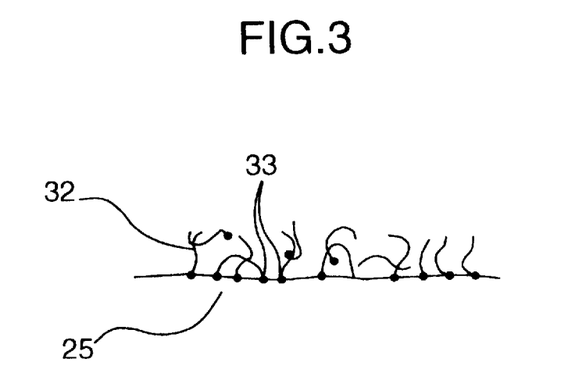
FIG. 3 is a schematic diagram illustrating combined lubricant of the present invention.
Figure 4:
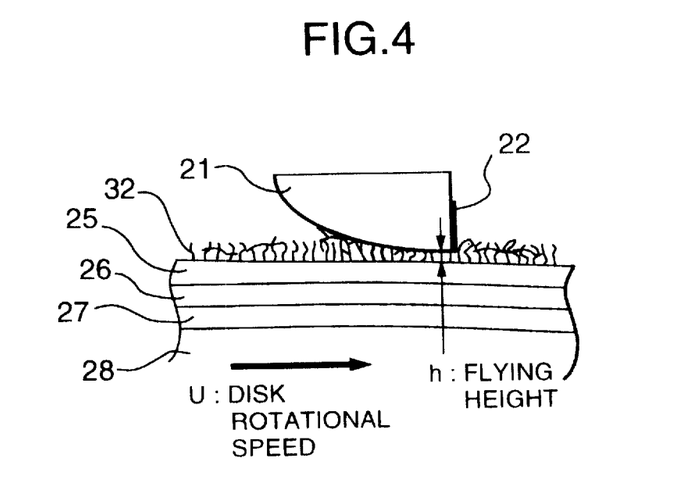
FIG. 4 is a side view schematically illustrating a contact system of the present invention.

Referring now to FIGS. 3 and 4, operation using the lubricant combined chemically or physically with the solid layer of the magnetic recording medium is described.

In the general concept of liquid, a number of liquids have the property of the non-Newtonian liquid of type A, while some of liquid having extremely thin liquid layer such as several nm to several tens nm in thickness combined with the solid layer as discussed in the present invention does not exhibit the liquid property and exhibits the behavior as if it is not liquid. FIG. 3 schematically illustrates an example of the lubricant in this state. For example, the liquid lubricant of PFPE system having the polar end group, the adsorbent group, the reaction group and the like is liquid in the bulk state before application of the liquid. The adsorbent group and the like are desirably arranged in end portions of the molecular chain of the lubricant and may be arranged at one side or both sides of the molecular chain. Further, a plurality of molecules may be attached to one polar end group. When it is formed on the surface of the magnetic disk with a thickness of about 5 to 50 nm, the polar end groups or the adsorbent groups 33 are adsorbed to a surface protection solid layer 25 such as, for example, carbon layer containing hydrogen and it is difficult that lubricant molecules 32 move on the surface freely. Further, in such a thickness, only the lubricant molecules of about monolayer to several molecule layers exist in the thickness direction and since there are adsorption and combination between the molecules and entanglement of the molecular chains, molecules capable of moving on the surface freely are not so much. In this state, the lubricant exhibits the nonliquid property and for example the viscosity thereof is considerably large as compared with the viscosity in the bulk state, so that it does not come within the category in which the liquid property such as Newtonian liquid or non-Newtonian liquid is discussed.

The nonliquid property can be understood, for example, as follows. When a magnetic disk having lubricant formed into thin film having a thickness of about 20 nm is rotated at a high speed of several thousands rpm and variation of the thickness reduced by scattering due to the centrifugal force is measured, it has been confirmed that only a very small amount of lubricant is scattered due to the centrifugal force as compared with an amount of centrifugally scattered lubricant calculated as liquid. This is because the lubricant formed into thin film cannot move freely as liquid and exhibits considerably large viscosity. Further, the nonliquid characteristic is confirmed by the fact that lubricant exists in the disk surface without separation from the disk surface even if the disk is immersed into flon, Fluorinert® or the like.

FIG. 4 is a side view illustrating a slider moving in contact with the lubricant. The configuration of the present invention is the same as that of FIG. 2 except lubricant 32. The lubricant 32 is the same as shown in FIG. 3 and is formed by laminating lubricant of PFPE system having, for example, the polar end group into monolayer to several molecular layers to have a thickness of about 5 to 50 nm. A few free molecules of lubricant existing on the disk surface are collected and deposited on the sides of flowing in the slider and flowing out from the slider and exist in the liquid state. It can be inferred easily that the small amount of liquid and air flowing in from the periphery of the slider are utilized to exhibit the function of the liquid dynamic pressure bearing and it belongs to the scope of the present invention. However, the essence of the present invention is to utilize the nonliquid lubricant combined and fixed to the protection layer and operation thereof is now described with reference to FIG. 4.

The nonliquid lubricant is combined with the protection layer by the polar end group and accordingly is not scattered by the centrifugal force except a few perfectly free molecules. Operation of supporting the slider is as follows. Molecules of lubricant under the movement surface of the slider are held between the slider and the protection layer and compressed. Since the lubricant molecules are high molecules having the molecular weight of about 1000 to 10000 and have molecular chains, combined portion with the protection layer or part of the molecular chains is bent by the compression so that the molecular combination or binding angle is changed to thereby produce the reaction force. This means that the molecular chains have the spring effect and the slider is supported by the spring effect of many molecules existing under the movement surface thereof. Since the stiffness of the molecular spring is larger than the stiffness by the dynamic pressure bearing of liquid, the moving stability of the slider is extremely good. When the flying height is used in the same manner as in FIG. 2, the length of the compressed molecular chain (h of FIG. 4) corresponds to the flying height. The length h of the compressed molecular chain is hereinafter referred to as the flying height.

Since the molecular spring does not utilize the fluid effect differently from the dynamic pressure bearing, the flying height does not depend on the rotational speed of the disk and is substantially determined by the thickness of the lubricant, the stiffness of the molecular chain, the number of molecules coming into contact with the slider and the pressing load imposed on the slider. As described above, the molecular spring can be also utilized together with the dynamic pressure effect of a few free molecules and air and in this case the floating design may be performed in consideration of the fluid dynamic factor. FIG. 4 shows the case where the fluid force is not utilized positively and by reducing the movement area of the slider, the fluid force is suppressed. If the slider is assumed to be a spherical surface and the radius of curvature thereof and the thickness of the lubricant are set to be about 0.5 to 20 mm and about 5 to 50 nm, respectively, the contact area with the lubricant molecules is $1.5 \times 10^{-5}$ to 0.006 mm$^2$ and even if the contact portion with free molecules in the periphery thereof is considered, the contact area is smaller than 0.1 mm$^2$. When the flying height is varied, the restoring force by variation of the number of operating molecules also acts on the slider by the varied contact area in addition to variation of the reaction force of the molecular spring and accordingly the slider is stable. Further, since the slider comes into contact with the lubricant with the curved surface even in any moving direction and its contact area is small, the proper contact state is obtained sufficiently by a small pressing load and accordingly the slider can be moved smoothly with small friction force to the lubricant. Accordingly, the present system is very preferable in respect to the stability of movement, the high-speed seeking operation and the power consumption and can suppress undesirable phenomena such as wear on the slider and the disk, the secular change of the lubricant, generation of heat and increase of temperature in the contact portion, adsorption and sticking in the same manner as in FIG. 2 even if the lubricant is not supplied or resupplied. Further, since the substantial contact point is practically one location in the vicinity of the end in which the reading/writing element is mounted, the slider support mechanism does not require rotatable support and the reading/writing element portion attains the minimum flying height in the same manner as in FIG. 2.

When a distance between the reading/writing element and the solid protection layer of the magnetic disk is smaller than 80 nm, it is particularly preferable since the high-density recording exceeding 1 Gbit/in$^2$ can be attained. However, when this distance is shorter than 10 nm, it is not preferable since the sliding-proof reliability is remarkably deteriorated. In addition, when the magnetic head slider is made of sintering material such as $ZrO_2$ system or $Al_2O_3$—TiC system, it is particularly preferable in respect to the reliability and the cost. More desirably, when a protection layer formed of a compound layer such as C, $SiO_2$ and Si is provided on at least the opposite surface to the medium, the reliability is extremely improved. The operation of the present invention has been described by taking the magnetic disk apparatus as an example, while the operation described above is not limited to the magnetic disk apparatus and is common to a magnetic storage apparatus having a distance of 0.1 micron or less between the magnetic head slider and the magnetic disk medium.

DETAILED DESCRIPTION OF THE PREFERRED EMBODIMENTS

An embodiment of the present invention is now described by taking a magnetic disk apparatus as an example.

Figure 5:
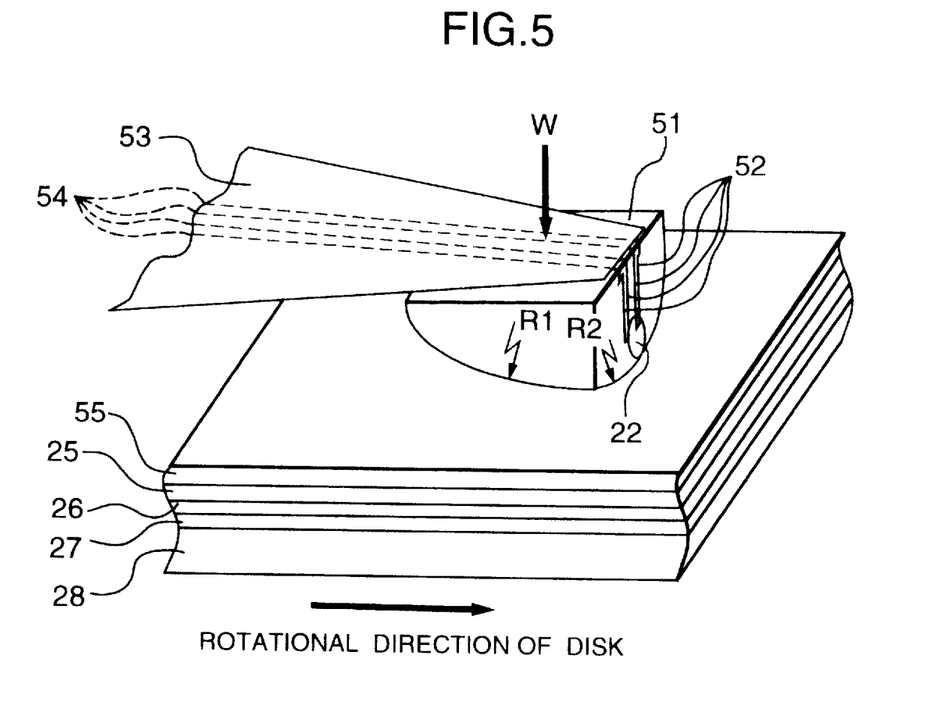
FIG. 5 is a perspective view illustrating a slider and its vicinity according to an embodiment.

FIG. 5 is a perspective view illustrating a slider and its vicinity according to an embodiment of the present invention. A magnetic head slider 51 is made of $Al_2O_3$—TiC and includes a curved movement surface and a rear planar end surface formed by machine work. Mounted on the rear end surface are a reading/writing element 22 and electrodes 52 for wiring. A protection layer made of $Si/C/SiO_2$ is formed on the movement surface, although not shown. The reading/writing element 22 utilizes the magnetoresistive effect described later and is formed by sputtering and etching. Further, the electrodes 52 are metal conductors made of aluminum alloy and are formed by evaporation and etching. A slider support mechanism 53 is made of flexible material such as polyimide and attains small stable load W of several tens milligram by a small spring constant in the pressing direction of 0.1 mg/μm which is difficult to achieve by means of conventional metal material. Further, as described above, the support mechanism 53 does not require a rotation and support mechanism in the prior art since the movement surface of the slider is a curved surface and the reading/writing element is disposed at the rear end surface as described above, and the support mechanism 53 is featured by being formed by a simple shape as shown in FIG. 5. Further, wiring of copper is provided on the surface of the support mechanism 53 by plating and etching and is electrically connected to the electrodes 52 by joining the support mechanism 53 to the slider, so that wiring is remarkably simplified as compared with the prior art. The curvatures $R_1$ and $R_2$ of the movement surface of the slider may be within an range of 0.5 to 20 mm as described later and the curvatures $R_1$ and $R_2$ may be the same value (spherical surface). The curvature $R_1$ in the main moving direction (the rotation direction of the disk) is set to 2 mm and the curvature $R_2$ in the seeking direction is set to 1 mm as the effective and practical curvatures in consideration of the balance of the speed in the main moving direction and the speed in the seeking direction. The curved surface thus structured becomes actually a three-dimensional curved surface having different curvatures at each portion of the surface locally and may be a curved surface such as a substantially spheroidal body, for example. The curvatures $R_1$ and $R_2$ discussed here show a representative curvature of such surfaces. The magnetic disk includes a nonmagnetic substrate 28 made of strengthened glass, NiP plating Aluminum alloy, ceramics such as SiC or the like, at least one basic layer 27 made of Nb, Cr, CrTi or the like and formed on the surface of the nonmagnetic substrate 28, at least one magnetic layer 26 of CoCrTa, CoCrPt, CoNiCr or the like formed on the basis layer 27, at least one protection layer 25 of C, (MoW)C, hydrogen-containing carbon, $ZrO_2$, (ZrNb)N or the like formed on the magnetic layer 26, all layers being formed by thin film fabrication technique such as sputtering, and lubricant 55 formed on the uppermost surface by dipping, spraying or the like. The lubricant 55 is different depending on the slider movement system and uses Newtonian liquid lubricant or non-Newtonian liquid lubricant having the viscosity increasing with increase of the shear rate in the case of the liquid bearing system while the lubricant 55 uses lubricant having the nonliquid property in the contact system. The embodiments are now described in order.

The embodiment of the liquid bearing system using the liquid lubricant as the lubricant 55 of FIG. 5 is now described. The liquid lubricant uses lubricant of perfluoro polyether system having the polar end group and diluted with a solvent into 0.5%. More particularly, the lubricant includes lubricant represented by $F(CF_2CF_2CF_2O)n$—$CF_2CF_2$—R such as, for example, DEMNUM® which is a trademark of Daikin Industry Company, and is such lubricant having the end group R changed to $COOCH_2$—$C_2F_5$, $COONH_3$—$C_6H_4$—O—$C_6H_4$ or OH—$COOCH_3$ by using its main chain. When the diluted solution is used to form the lubricant layer having a thickness of 5 to 100 nm, the lubricant exhibits the Newtonian characteristic within the practical velocity range of 0 to 15 m/s. Accordingly, the centrifugal scattering quantity is small and further the stiffness of the liquid layer is large, so that the slider floats or flies stably.

Figure 6:
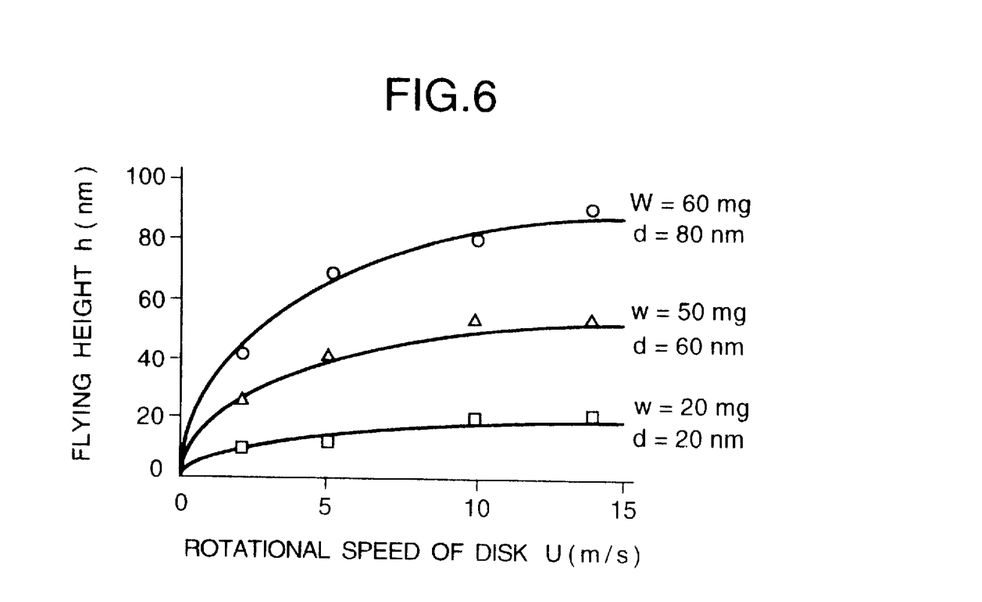
FIG. 6 is a diagram showing characteristics of the liquid bearing system.

FIG. 6 shows measured results of the relation of the rotational speed U of the disk and the flying height h when the slider flies on the liquid lubricant with a combination of the pressing load W of 20 to 60 mg and the lubricant thickness d of 20 to 80 nm. The flying height was measured collectively by means of the optical method and reproduced waveforms of magnetically recorded information. The slider flew stably for any combination of the pressing load W and the lubricant thickness d without sticking and with small liquid drag force and the seeking characteristic is satisfactory. The dependence of the flying height on the rotational speed of the disk can be made small remarkably by the lift compression effect. There is a case where the flying height exceeds 80 nm for the lubricant thickness of 80 nm since a large quantity of lubricant is locally collected in the periphery of the slider, particularly in the vicinity of the flowing-in portion of liquid by raking up lubricant by the slider, while the flying height can be made small by setting the load and the curvature of the slider to be proper. Others and fundamental effects of the present invention are as described in the above item of "operation".

The embodiment of the contact system using lubricant having the nonliquid property and combined chemically or physically with the solid layer of the magnetic recording medium as the lubricant 55 of FIG. 5 is now described. The lubricant may be lubricant of perfluoro polyether system having the reactive end group or the polar end group having the stronger adsorbent characteristic or may be the lubricant formed in a fixed quantity and having most of free lubricant removed by flon, Fluorinert® or the like. More particularly, the lubricant may be lubricant having the end thereof formed to the reactive end group or the polar end group having the stronger adsorbent characteristic by using the main chain of DEMNUM® of the trademark of Daikin Industry Company, for example. The reactive end group includes isocyanate group and the polar end group having the stronger adsorbent characteristic includes COOH. When carbon system material is used as the protection layer, the adsorbent property is preferably increased by using high hardness material containing metal or forming it in argon containing hydrogen or $CH_4$ so as to increase $SP^3$ binding component. Further, it is particularly preferable in the process that the surface of the protection layer is activated to be apt to adsorb the lubricant extremely by etching the surface of the protection layer 25 of FIG. 5 with oxygen before the lubricant layer is formed. Then, when the lubricant is applied, the lubricant of the reactive end group type gives rise to chemical adsorption by the chemical reaction to the surface of the protection layer and the lubricant of the polar end group type gives rise to physical adsorption, so that molecules of the lubricant are fixed to the protection layer strongly in any case. More desirably, by washing the surface with solvent such as flon, Fluorinert® or the like, most of remaining lubricant which is not adsorbed is removed and many molecules adsorbed on the surface can be left. In this manner, the lubricant layer having monolayer to several molecular layers, that is, 5 to 50 nm in thickness can be formed. The lubricant in this state does not exhibit the liquid property already and when the effective viscosity, for example, is estimated, it has been found that the viscosity is increased by three digits or more as compared with that in the bulk state. In the present system, since the centrifugal scattering quantity is small within the practical speed range of 0 to 15 m/s and the molecular spring is utilized as described in the "operation", the stiffness for supporting the slider is large and the slider is moved stably.

Figure 7:
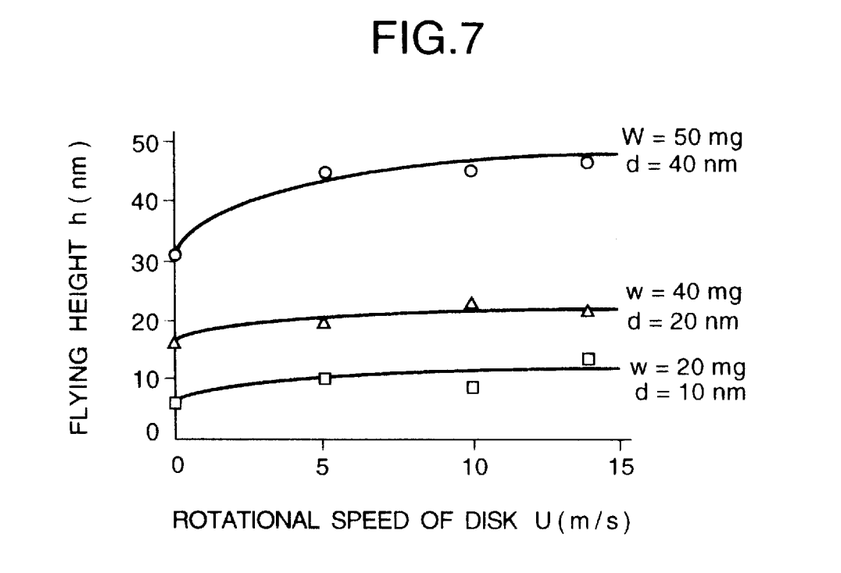
FIG. 7 is a diagram showing characteristics of the contact system.

FIG. 7 shows measured results of the relation of the rotational speed U of the disk and the distance h (hereinafter referred to as the flying height h) of the molecular spring compressed under the slider when the slider is moved on the nonliquid lubricant with a combination of the pressing load W of 20 to 50 mg and the lubricant thickness d of 10 to 40 nm. The flying height was measured collectively by means of the optical method and reproduced waveform of magnetically recorded information. The slider flew stably for any combination of the pressing load W and the lubricant thickness d without sticking and with small friction force and the seeking characteristic is satisfactory. In the case of d=40 nm, since the lubricant exhibits slightly liquid property and further there is also the influence of the lift of air flowing in the slider, the dependence of the flying height on the rotational speed of the disk is slightly recognized. However, the dependence of the flying height on the rotational speed of the disk is considerably small even in any conditions as compared with the case of the above liquid bearing. This demonstrates that the present system does not use the fluid dynamic pressure bearing basically and the slider is moved by the fact that the lubricant behaves in the nonliquid manner and acts as the molecular spring. In addition, the fact that the lubricant behaves in the nonliquid manner is demonstrated by the fact that the flying height is present at the rotational speed of 0 and the flying height is substantially near to the thickness of the lubricant even in any rotational speed of the disk. Others and the fundamental effects of the present invention are as described in the item of "operation".

Figure 8:
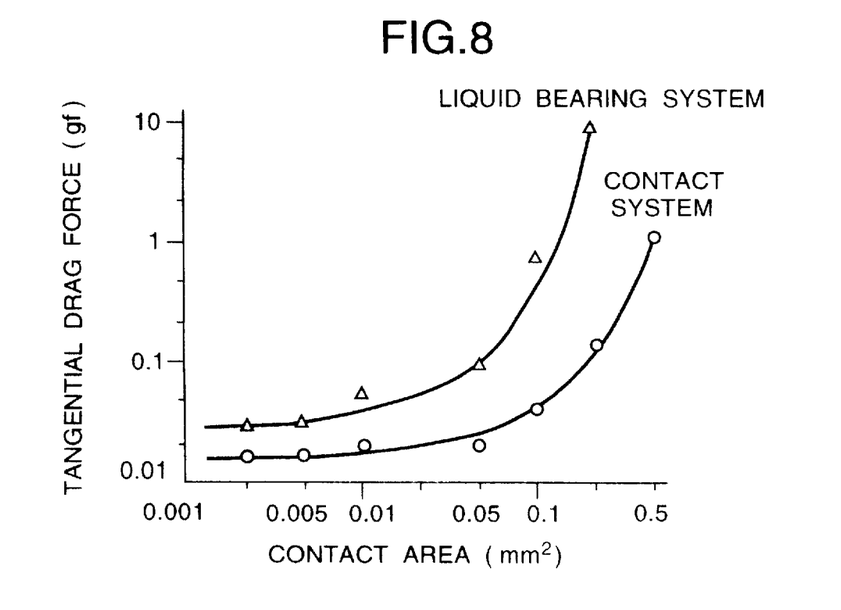
FIG. 8 is a diagram showing effects of a contact area.

FIG. 8 shows a relation of the contact area and the tangential drag force. The relation of the contact area and the drag force was measured by using the substantially spherical slider having the radius of curvature of about 1 mm and changing a thickness of lubricant. The liquid drag force appears mainly as the tangential drag force in the case of the Newtonian liquid lubricant and the adsorption force and the attraction of the molecules appear as the friction force in the case of the non-Newtonian liquid lubricant. In either case, the substantially same tendency is exhibited and the tangential drag force is small in the contact area of 0.1 mm$^2$ or less as shown in FIG. 8, which is preferable as the magnetic disk apparatus.

Figure 9:
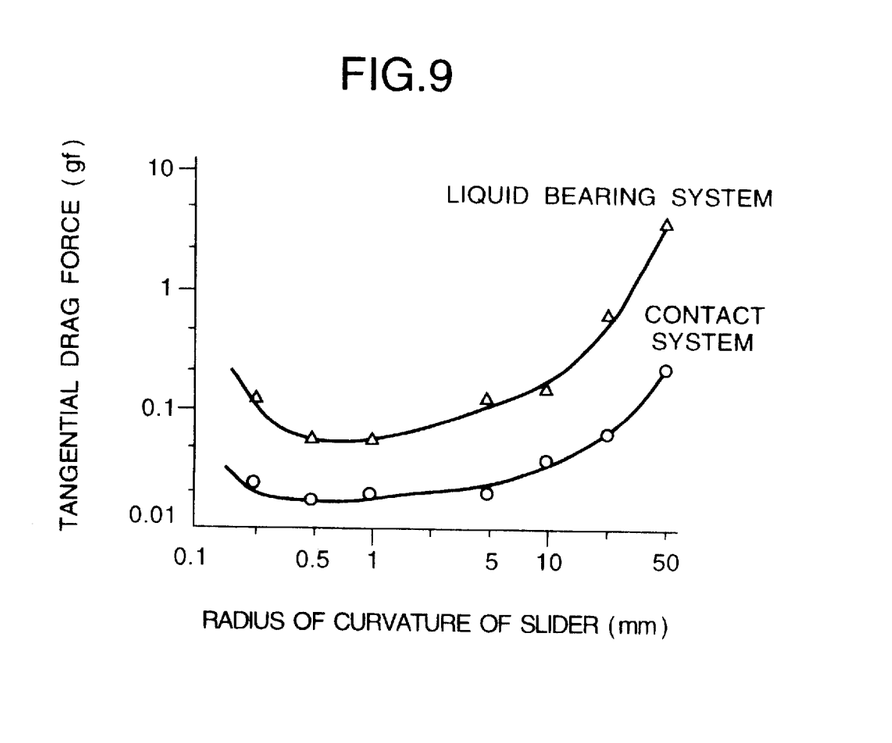
FIG. 9 is a diagram showing effects of the curvature of a slider.

FIG. 9 shows a relation of the radius of curvature of the slider and the tangential drag force. The slider having the substantially spherical shape was used. In either system, when the small drag force in the radius of curvature of 20 mm or less, a remarkably increased contact pressure in the radius of curvature of 0.5 mm or less and a problem of manufacturing the slider are considered, it is most desirable that the radius of curvature is set to be larger than 0.5 mm and smaller than 20 mm.

Figure 10:
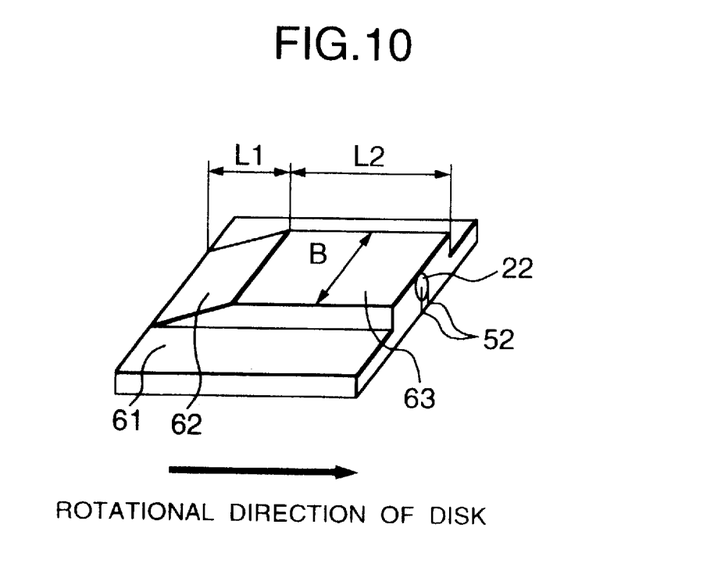
FIG. 10 is a perspective view illustrating an embodiment of a slider.
Figure 11:
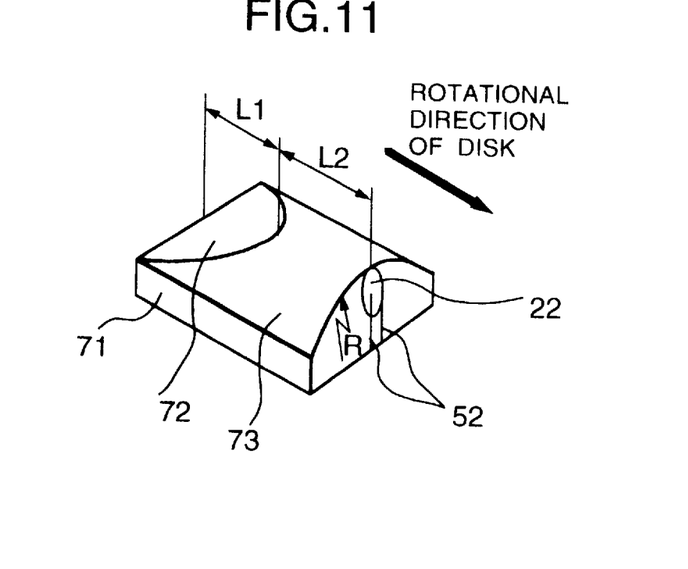
FIG. 11 is a perspective view illustrating an embodiment of a slider.

FIGS. 10 and 11 illustrate the sliders satisfying the requirement of the present invention. The slider 61 of FIG. 10 includes one taper flat rail formed by two planes composed of a taper plane 62 and a flat plane 63. A reading/writing element 22 described later and the same wiring 52 as that of FIG. 5 are formed in the rear end surface. By using one rail, the contact area with the lubricant can be reduced and the rotation mechanism with one degree of freedom or the slider support mechanism without a rotation mechanism can be used. Further, the above contact area condition is satisfied and the satisfactory characteristics are obtained by using a proper thickness of the lubricant and setting the dimensions of each portion of he slider to the following ranges approximately. The slider width B of about 0.05 to 0.3 mm, L1 of about 0.05 to 0.5 mm and L2 of about 0.05 to 1 mm are practically preferable. Since the slider of FIG. 10 is angular in the seeking direction and the drag force in the seeking direction is slightly large, it is preferable that so-called chamfering working having the curvature of about 0.5 mm is performed to the angular portions, although not shown. However, the slider is featured in that manufacturing thereof is easy as compared with that having a curved surface or a cylindrical surface.

A slider 71 shown in FIG. 11 includes a cylindrical surface 73 and a flat taper plane 72, and the reading/writing element 22 and the wiring 52 are formed on the rear end surface. This slider is easy to manufacture as compared with that having a curved surface and is moved smoothly in the seeking direction. The curvature R of the cylindrical surface of about 0.5 to 20 mm, L1 of about 0.05 to 0.5 mm and L2 of about 0.05 to 1 mm are preferable in the same manner as in the curved surface.

Figure 12:
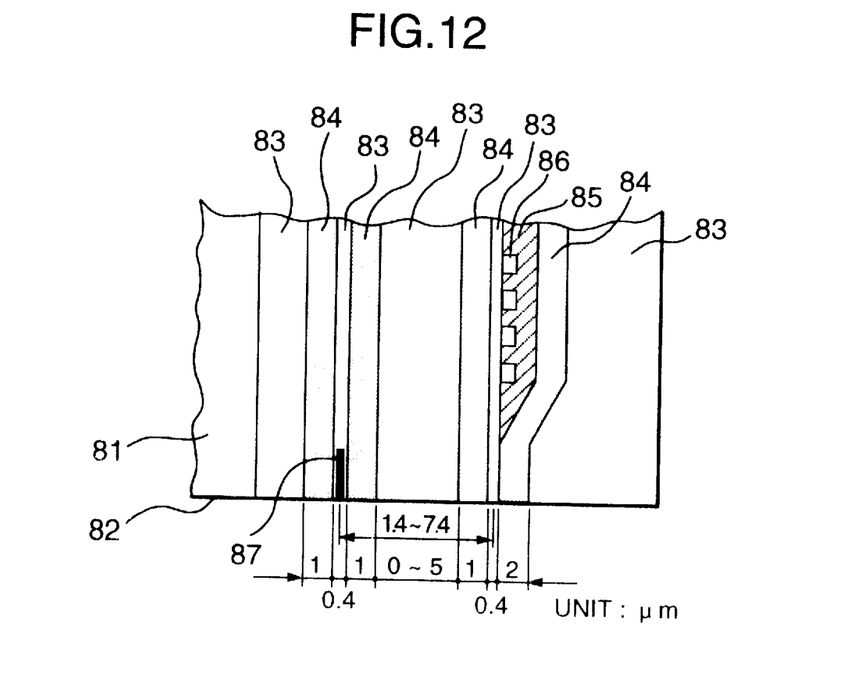
FIG. 12 is a sectional view illustrating an embodiment of a reading/writing element.

FIG. 12 is an enlarged sectional view illustrating the reading/writing element used in the present invention. The element is disposed in the rear end portion 81 of the slider as a whole, and numeral 82 denotes a movement surface. Numeral 83 denotes layers mainly composed of $Al_2O_3$ which perform a role of insulation layer or a protection layer. Numeral 84 denotes a soft magnetic layer made of Fe—Ni—N alloy, Co—Fe alloy, Fe—Al—Si alloy, permalloy or the like, 87 denotes an MR (magnetoresistive effect) reproducing or reading sensor made of a permalloy having large magnetoresistive effect, a laminated layer of the permalloy and Cu alloy, or a laminated layer of permalloy and Cu alloy and antiferrormagnetic layer of NiO or the like. These portions are successively fabricated by the thin film technique such as sputtering, plating or evaporation. Numeral 85 denotes a nonconductive layer made of resist or polyimide and numeral 86 denotes a section of a coil made of copper, aluminum alloy or the like and formed by evaporation or etching. The coil is used for recording or writing. Thickness of the respective portions is set approximately as shown in FIG. 12. When a distance of the writing portion and the reading portion of the MR element is zero, it means that the magnetic portion is shared. The soft magnetic poles may be a multi-layer. A current flows in the coil 86 to thereby generate a magnetic field so that writing is performed, and reading is performed by the magnetoresistive effect of the MR sensor 87. By structuring the reading/writing element as described above, the reading/writing efficiency is particularly satisfactory and the high density recording of the class of Gbit/in$^2$ in the plane recording density can be attained. The embodiment of the present invention has been described by taking the magnetic disk apparatus as an example, while the present invention is not limited to the magnetic disk apparatus and the embodiment described above is common to a magnetic storage apparatus having a distance of the magnetic head slider and the magnetic recording medium of 0.1 micron or less.

Figure 14:
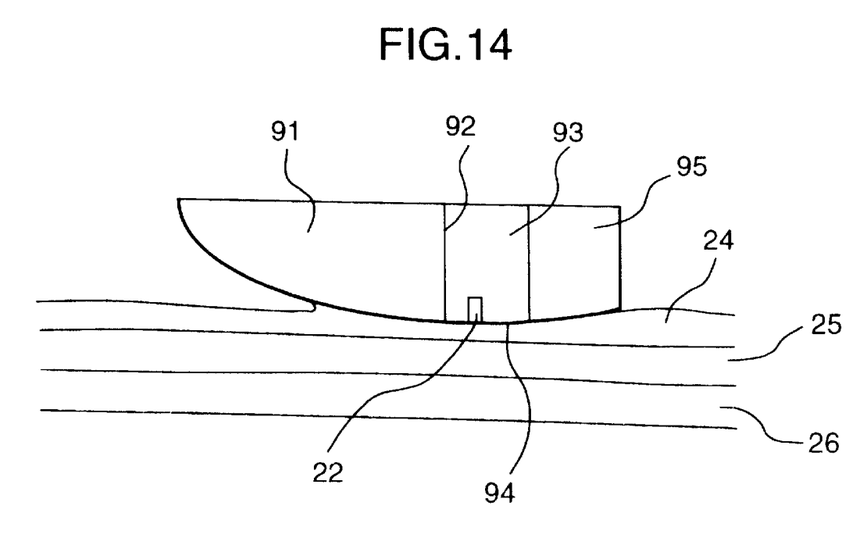
FIG. 14 is a side view illustrating an embodiment of a slider.

FIGS. 13 and 14 illustrate examples of shapes of sliders utilizing negative pressure positively. A slider 91 of FIG. 13 includes a rear end surface 92 disposed in the rear side in the moving direction and formed into a substantially flat surface and an element layer structure 93 disposed on the rear end surface 92 for fixedly holding the reading/writing element 22 therein. A surface of the element layer structure 93 opposite to the magnetic recording medium 25 is formed into a movement surface 94 shaped into a curved surface having a curvature and the reading/writing element 22 is disposed in a point of the movement surface 94 which is substantially nearest to the magnetic recording medium 25. In the minimum gap distribution in the moving direction of the slider formed between the movement surface 94 and the magnetic recording medium 25, an area where the gap is substantially expanded is produced and producing negative pressure in the rear of the reading/writing element 22 in the moving direction of the slider due to the curvature of the movement surface 94.

As described in the item of "operation", since negative pressure is produced in the area where the gap is expanded in the moving direction, reduction in thickness of the lubricant on the movement track of the slider can be reduced. Further, the dependence of the flying height on the rotational speed of the disk can be reduced. Heretofore, it is stated in the field of the liquid bearing that the negative pressure does not act on liquid. This is the case where the mass of the bearing plane is large and it does not move substantially and furthermore the pressure is considerably large. In the case of an object such as the magnetic head slider having a very small mass, the slider moves so that the pressure in the liquid portion does not become negative. Consequently, the pressure in the liquid portion does not become negative finally, while slightly negative pressure is produced temporarily in the course of movement of the slider.

In FIG. 14, the same numerals as those of FIG. 13 designate the same portions as those of FIG. 13. The slider 91 of FIG. 14 further includes a protection layer 95 formed on the surface of the element layer structure 93. In this case, since the length in the moving direction of the expanded gap area formed in the rear of the reading/writing element in the moving direction of the slider can be formed long as compared with the embodiment of FIG. 13, reduction in thickness of the lubricant on the movement track and the dependence of the flying height on the rotational speed of the disk can be reduced effectively.

According to the present invention, in the magnetic storage apparatus of the liquid bearing system or the contact system, the liquid drag force and the friction force or the sticking force are very small and the dependence of the flying height on the rotational speed can be reduced. In addition, the slider can move stably with the flying height of 10 to 80 nm without scattering of lubricant. Further, the slider support mechanism can be simplified and the efficient reading/writing element can be mounted in the optimum position. It is not necessary to provide means for supplying or resupplying lubricant. Thus, the magnetic storage apparatus capable of attaining the high-speed seeking operation and with high reliability and high recording density can be provided.

The present invention has been described in detail, it should be understood that various changes, substitutions and alterations can be made hereto without departing from the spirit and scope of the present invention as defined by the appended claims.

We claim:

1. A magnetic storage apparatus including a substantially non-flexible magnetic recording medium, a magnetic head slider having a reading/writing element mounted therein and liquid lubricant provided on the surface of said magnetic recording medium, wherein said liquid lubricant comprises a liquid in a Newtonian range in which viscosity thereof is substantially constant irrespective of a shear rate or a liquid having the property that actual viscosity is increased with increase of the shear rate and said magnetic head slider maintains a gap between said slider and said magnetic recording medium to perform reading and writing while being moved on said liquid lubricant intermittently or continuously in a contact manner with said liquid lubricant, and comprising means for maintaining a flying height which is a distance of said gap constant even if a movement speed is varied, wherein the shear rate is determined by the speed of rotation of said magnetic recording medium divided by the flying height of said magnetic head slider.

2. A magnetic storage apparatus according to claim 1, wherein said magnetic head slider includes one movement rail for moving said magnetic head slider on a surface of magnetic disk.

3. A magnetic storage apparatus according to claim 2, wherein said reading/writing element is disposed in a substantially rear edge in a movement direction of said magnetic head slider.

4. A magnetic storage apparatus according to claim 3, wherein said reading/writing element is formed within an element layer structure for fixing said reading/writing element and a surface of said element layer structure opposite to said magnetic recording medium is formed into an element layer structure movement surface constituted by a curved surface having a curvature, said reading/writing element being disposed in a point of said element layer structure movement surface which is substantially nearest to said magnetic recording medium, a minimum gap distribution in the movement direction of said slider formed between said element layer structure movement surface and said magnetic recording medium including an area where the gap is substantially expanded in the rear of said reading/writing element in the movement direction of said slider.

5. A magnetic storage apparatus according to claim 3, wherein said reading/writing element is formed within an element layer structure for fixing said reading/writing element and a protection layer is formed in a rear surface of said element layer structure in the movement direction of said slider, a surface of a rear end layer structure constituted by said element layer and said protection layer and opposite to said magnetic recording medium being formed into a rear end layer movement surface constituted by a curved surface having a curvature, said reading/writing element being disposed in a point of said rear end layer movement surface which is substantially nearest to said magnetic recording medium, a minimum gap distribution in the movement direction of said slider formed between said rear end layer movement surface and said magnetic recording medium including an area where the gap is substantially expanded in the rear of said reading/writing element in the movement direction of said slider.

6. A magnetic storage apparatus according to claim 1, wherein at least a portion of a movement surface of said magnetic head slider is substantially cylindrical.

7. A magnetic storage apparatus according to claim 6, wherein said reading/writing element is disposed in a substantially rear edge in the movement direction of said magnetic head slider.

8. A magnetic storage apparatus according to claim 7, wherein said reading/writing element is formed within an element layer structure for fixing said reading/writing element and a surface of said element layer structure opposite to said magnetic recording medium is formed into an element layer structure movement surface constituted by a curved surface having a curvature, said reading/writing element being disposed in a point of said element layer structure movement surface which is substantially nearest to said magnetic recording medium, a minimum gap distribution in the movement direction of said slider formed between said element layer structure movement surface and said magnetic recording medium including an area where the gap is substantially expanded in the rear of said reading/writing element in the movement direction of said slider.

9. A magnetic storage apparatus according to claim 7, wherein said reading/writing element is formed within an element layer structure for fixing said reading/writing element and a protection layer is formed in a rear surface of said element layer structure in the movement direction of said slider, a surface of a rear end layer structure constituted by said element layer and said protection layer and opposite to said magnetic recording medium being formed into a rear end layer movement surface constituted by a curved surface having a curvature, said reading/writing element being disposed in a point of said rear end layer movement surface which is substantially nearest to said magnetic recording medium, a minimum gap distribution in the movement direction of said slider formed between said rear end layer movement surface and said magnetic recording medium including an area where the gap is substantially expanded in the rear of said reading/writing element in the movement direction of said slider.

10. A magnetic storage apparatus according to claim 1, wherein said reading/writing element includes at least a reading element using the magnetoresistive effect.

11. A magnetic storage apparatus according to claim 1, wherein a distance between said reading/writing element and a solid protection layer of said magnetic recording medium is longer than 10 nm and shorter than 80 nm.

12. A magnetic storage apparatus according to claim 1, wherein said magnetic head slider is made of sintering material such as $ZrO_2$ system or $Al_2O_3$—TiC system.

13. A magnetic storage apparatus according to claim 1, comprising at least one protection layer disposed in a surface of said magnetic head slider opposite to at least said magnetic recording medium and made of material different from that of said slider.

14. A magnetic storage apparatus according to claim 1, wherein said lubricant is chemically or physically combined with the surface of said magnetic recording medium, and wherein said magnetic head slider includes only one movement rail for moving said magnetic head slider on a surface of magnetic disk.

15. A magnetic storage apparatus according to claim 14, wherein said reading/writing element is disposed in a substantially rear edge in a movement direction of said magnetic head slider.

16. A magnetic storage apparatus according to claim 15, wherein said reading/writing element is formed within an element layer structure for fixing said reading/writing element and a surface of said element layer structure opposite to said magnetic recording medium is formed into an element layer structure movement surface constituted by a curved surface having a curvature, said reading/writing element being disposed in a point of said element layer structure movement surface which is substantially nearest to said magnetic recording medium, a minimum gap distribution in the movement direction of said slider formed between said element layer structure movement surface and said magnetic recording medium including an area where the gap is substantially expanded in the rear of said reading/writing element in the movement direction of said slider.

17. A magnetic storage apparatus according to claim 15, wherein said reading/writing element is formed within an element layer structure for fixing said reading/writing element and a protection layer is formed in a rear surface of said element layer structure in the movement direction of said slider, a surface of a rear end layer structure constituted by said element layer and said protection layer and opposite to said magnetic recording medium being formed into a rear end layer movement surface constituted by a curved surface having a curvature, said reading/writing element being disposed in a point of said rear end layer movement surface which is substantially nearest to said magnetic recording medium, a minimum gap distribution in the movement direction of said slider formed between said rear end layer movement surface and said magnetic recording medium including an area where the gap is substantially expanded in the rear of said reading/writing element in the movement direction of said slider.

18. A magnetic storage apparatus according to claim 14, wherein at least a portion of a movement surface of said magnetic head slider is substantially cylindrical.

19. A magnetic storage apparatus according to claim 18, wherein said reading/writing element is disposed in a substantially rear edge in the movement direction of said magnetic head slider.

20. A magnetic storage apparatus according to claim 14, wherein said reading/writing element includes at least a reading element using the magnetoresistive effect.

21. A magnetic storage apparatus according to claim 14, wherein a distance between said reading/writing element and a solid protection layer of said magnetic recording medium is longer than 10 nm and shorter than 80 nm.

22. A magnetic storage apparatus according to claim 14, wherein said magnetic head slider is made of sintering material such as $ZrO_2$ system or $Al_2O_3$—TiC system.

23. A magnetic storage apparatus according to claim 14, comprising at least one protection layer disposed in a surface of said magnetic head slider opposite to at least said medium and made of material different from that of said slider.

24. A magnetic storage apparatus according to claim 1, wherein said lubricant is chemically or physically combined with the surface of said magnetic recording medium, wherein at least a portion of a movement surface of said magnetic head slider is substantially cylindrical, wherein said reading/writing element is disposed in a substantially rear edge in the movement direction of said magnetic head slider, and wherein said reading/writing element is formed within an element layer structure for fixing said reading/writing element and a surface of said element layer structure opposite to said magnetic recording medium is formed into an element layer structure movement surface constituted by a curved surface having a curvature, said reading/writing element being disposed in a point of said element layer structure movement surface which is substantially nearest to said magnetic recording medium, a minimum gap distribution in the movement direction of said slider formed between said element layer structure movement surface and said magnetic recording medium including an area where the gap is substantially expanded in the rear of said reading/writing element in the movement direction of said slider.

25. A magnetic storage apparatus according to claim 1, wherein said lubricant is chemically or physically combined with the surface of said magnetic recording medium, wherein at least a portion of a movement surface of said magnetic head slider is substantially cylindrical, wherein said reading/writing element is disposed in a substantially rear edge in the movement direction of said magnetic head slider, and wherein said reading/writing element is formed within an element layer structure for fixing said reading/writing element and a protection layer is formed in a rear surface of said element layer structure in the movement direction of said slider, a surface of a rear end layer constituted by said element layer structure and said protection layer and opposite to said magnetic recording medium being formed into a rear end layer movement surface constituted by a curved surface having a curvature, said reading/writing element being disposed in a point of said rear end layer movement surface which is substantially nearest to said magnetic recording medium, a minimum gap distribution in the movement direction of said slider formed between said rear end layer movement surface and said magnetic recording medium including an area where the gap is substantially expanded in the rear of said reading/writing element in the movement direction of said slider.

26. A magnetic storage apparatus, according to claim 1, wherein said lubricant is chemically or physically combined with the surface of said magnetic recording medium and said magnetic head slider comprises a movement surface having at least a curved surface with a curvature in a main moving direction and a direction perpendicular to said movement direction and a rear end surface in said movement direction constituted by one or more substantially flat surfaces.

27. A magnetic storage apparatus according to claim 26, wherein said curvature of said curved surface in said main moving direction is different from that in the direction perpendicular to said moving direction.

28. A magnetic storage apparatus according to claim 26, wherein said curvature of said curved surface is larger than 0.5 mm and smaller than 20 mm.

29. A magnetic storage apparatus according to claim 26, wherein said reading/writing element is disposed in a substantially rear edge of said magnetic head slider in the moving direction.

30. A magnetic storage apparatus according to claim 29, wherein said reading/writing element is formed within an element layer structure for fixing said reading/writing element and a surface of said element layer structure opposite to said magnetic recording medium is formed into an element layer structure movement surface constituted by a curved surface having a curvature, said reading/writing element being disposed in a point of said element layer structure movement surface which is substantially nearest to said magnetic recording medium, a minimum gap distribution in the movement direction of said slider formed between said element layer structure movement surface and said magnetic recording medium including an area where the gap is substantially expanded in the rear of said reading/writing element in the movement direction of said slider.

31. A magnetic storage apparatus according to claim 29, wherein said reading/writing element is formed within an element layer structure for fixing said reading/writing element and a protection layer is formed in a rear surface of said element layer structure in the movement direction of said slider, a surface of a rear end layer structure constituted by said element layer and said protection layer and opposite to said magnetic recording medium being formed into a rear end layer movement surface constituted by a curved surface having the a curvature, said reading/writing element being disposed in a point of said rear end layer movement surface which is substantially nearest to said magnetic recording medium, a minimum gap distribution in the movement direction of said slider formed between said rear end layer movement surface and said magnetic recording medium including an area where the gap is substantially expanded in the rear of said reading/writing element in the movement direction of said slider.

32. A magnetic storage apparatus including a substantially non-flexible magnetic recording medium, a magnetic head slider having a reading/writing element mounted therein and liquid lubricant provided on the surface of said magnetic recording medium, wherein said liquid lubricant comprises a liquid in a Newtonian range in which viscosity thereof is substantially constant irrespective of a shear rate or liquid having the property that actual viscosity is increased with increase of the shear rate and said magnetic head slider includes a movement surface having at least a curved surface with a curvature in a main moving direction and a direction perpendicular to said moving direction and a rear end surface in the moving direction constituted by one or more substantially flat surfaces, said magnetic head slider maintaining a gap between said slider and said magnetic recording medium to perform reading and writing while being moved on said liquid lubricant intermittently or continuously in a contact manner with said liquid lubricant, and comprising means for maintaining a flying height which is a distance of said gap constant even if a movement speed is varied, wherein the shear rate is determined by the speed of rotation of said magnetic recording medium divided by the flying height of said magnetic head slider.

33. A magnetic storage apparatus according to claim 32, wherein said curvature of said curved surface in said main moving direction is different from that in the direction perpendicular to said moving direction.

34. A magnetic storage apparatus according to claim 32, wherein said curvature of said curved surface is larger than 0.5 mm and smaller than 20 mm.

35. A magnetic storage apparatus according to claim 32, wherein said reading/writing element is disposed in a substantially rear edge of said magnetic head slider in the moving direction.

36. A magnetic storage apparatus according to claim 35, wherein said reading/writing element is formed within an element layer structure for fixing said reading/writing element and a surface of said element layer structure opposite to said magnetic recording medium is formed into an element layer structure movement surface constituted by a curved surface having a curvature, said reading/writing element being disposed in a point of said element layer structure movement surface which is substantially nearest to said magnetic recording medium, a minimum gap distribution in the movement direction of said slider formed between said element layer structure movement surface and said magnetic recording medium including an area where the gap is substantially expanded in the rear of said reading/writing element in the movement direction of said slider.

37. A magnetic storage apparatus according to claim 35, wherein said reading/writing element is formed within an element layer structure for fixing said reading/writing element and a protection layer is formed in a rear surface of said element layer structure in the movement direction of said slider, a surface of a rear end layer structure constituted by said element layer and said protection layer and opposite to said magnetic recording medium being formed into a rear end layer movement surface constituted by a curved surface having a curvature, said reading/writing element being disposed in a point of said rear end layer movement surface which is substantially nearest to said magnetic recording medium, a minimum gap distribution in the movement direction of said slider formed between said rear end layer movement surface and said magnetic recording medium including an area where the gap is substantially expanded in the rear of said reading/writing element in the movement direction of said slider.

* * * * *